US012351516B2

(12) United States Patent
Burnett et al.

(10) Patent No.: US 12,351,516 B2
(45) Date of Patent: Jul. 8, 2025

(54) ROAD MAKING MATERIAL COMPRISING PVC, A METHOD OF PRODUCING SAID ROAD MAKING MATERIAL AND A ROAD MADE THEREFROM

(71) Applicant: Macrebur Limited, Dumfries & Galloway (GB)

(72) Inventors: Nicholas Peter Burnett, Dumfries & Galloway (GB); Gordon Michael Reid, Dumfries & Galloway (GB); Toby Jon McCartney, Dumfries & Galloway (GB)

(73) Assignee: Macrebur Limited, Lockerbie (GB)

( * ) Notice: Subject to any disclaimer, the term of this patent is extended or adjusted under 35 U.S.C. 154(b) by 752 days.

(21) Appl. No.: 17/595,048

(22) PCT Filed: May 7, 2020

(86) PCT No.: PCT/EP2020/062790
§ 371 (c)(1),
(2) Date: Nov. 8, 2021

(87) PCT Pub. No.: WO2020/229323
PCT Pub. Date: Nov. 19, 2020

(65) Prior Publication Data
US 2022/0220033 A1     Jul. 14, 2022

(30) Foreign Application Priority Data

May 10, 2019   (GB) ..................... 1906629

(51) Int. Cl.
C04B 26/26 (2006.01)
C04B 16/04 (2006.01)
C04B 18/20 (2006.01)
E01C 7/26 (2006.01)
E01C 19/02 (2006.01)
C04B 111/00 (2006.01)
E01C 19/18 (2006.01)

(52) U.S. Cl.
CPC .............. C04B 26/26 (2013.01); C04B 16/04 (2013.01); C04B 18/20 (2013.01); E01C 7/26 (2013.01); E01C 19/02 (2013.01); C04B 2111/0075 (2013.01); E01C 19/18 (2013.01)

(58) Field of Classification Search
CPC ................................. C08L 95/00; C08L 27/06
See application file for complete search history.

(56) References Cited

U.S. PATENT DOCUMENTS 4,028,293 A     6/1977   Van Den Berg
2006/0243163 A1  11/2006  Martin

FOREIGN PATENT DOCUMENTS

| CN | 106277941 A | 1/2017 |
| JP | H06192578 A | 7/1994 |
| WO | 199312297 A1 | 6/1993 |
| WO | 2017037732 A1 | 3/2017 |
| WO | 2017199013 A1 | 11/2017 |
| WO | 2019092254 A1 | 5/2019 |

OTHER PUBLICATIONS

Behl et al., "A Sustainable Approach: Utilization of Waste PVC in Asphalting of Roads", Construction and Building Materials, vol. 54, Mar. 15, 2014, pp. 113-117.
F. P. Reding et al., "Glass transition and melting point of poly(vinyl chloride)", Journal of Polymer Science, vol. 56, No. 163, Jan. 1, 1962, pp. 225-231.
Ribelles, et al., "Glass transition and physical ageing in plasticized poly(vinyl chloride)", Polymer, Elsevier Science Publishers B.V, GB, vol. 28, No. 13, Dec. 1, 1987, pp. 2262-2266.
M. Benes, et al., "Characterization of PVC cable insulation materials and products obtained after removal of additives", Journal of Applied Polymer Science, vol. 99, No. 3, Feb. 5, 2006, pp. 788-795.
Allen, Glen Keith, "Problems of Stone Mastic Asphalt Use In North Queensland (THESIS)", Thesis, Nov. 1, 2006, pp. 1-259, Northj Queensland, Australia Retrieved from the Internet: URL:https://eprints.usq.edu.au/2394/1/ALLE Nglen 2006.pdf.
Anonymous: "Specification for Stone Mastic Asphalt Surface Course", Nov. 1, 2013, pp. 1-10, Retrieved from the Internet: URL:https://www.lincolnshire.gov.uk/Download/64529.
Jensen, Bjarne Bo et al., "15 Years Experience Adding Polymer Powder Directly into the Asphalt Mixer", 5th Eurasphalt & Eurobitume Congress, Jun. 3-15, 2012, Istanbul, Turkey, Jun. 15, 2012 (Jun. 15, 2012), pp. 1-8, Retrieved from the Internet:URL:https://www.h-a-d.hr/pubfile.php?id=436.
Visconti, Paolo, "PMA Polymer Modified Asphalt", The 1st Albanian Congress on Roads, Jan. 1, 2012 (Jan. 1, 2012), pp. 1-57, Tirana, Albania, p. 3.
Ziari, et al., "The effect of EAF dust and waste PVC on moisture sensitivity, rutting resistance, and fatigue performance of asphalt binders and mixtures", Construction and Building Materials, vol. 203, Jan. 24, 2019, pp. 188-200.
Fang, et al., "Modification of waterproofing asphalt by PVC packaging waste", Journal of Vinyl and Additive Technology, vol. 15, No. 4, Dec. 1, 2009, pp. 229-233.
Ragab, A.A., et al. "Using waste flexible polyvinyl chloride treated with DOP/calcium hydroxide for enriching the performance of oxidizing bitumen", Journal of Thermal Analysis and Calorimetry, Kluwer, Dordrecht, NL, vol. 136, No. 3, Sep. 28, 2018, pp. 1079-1091.

(Continued)

Primary Examiner — Ling Siu Choi
Assistant Examiner — Olga Lucia Donahue
(74) Attorney, Agent, or Firm — Greenberg Traurig, LLP; David J. Dykeman; Roman Fayerberg

(57) ABSTRACT

The present invention provides a method for producing a road making material and a road making material, the road making material comprising more than 10% polyvinylchloride (PVC) by weight and the polyvinylchloride having a glass transition temperature of no more than 180° C.

13 Claims, No Drawings

(56) References Cited

OTHER PUBLICATIONS

Bin-Huang, et al., "Compound modification of asphalt with PVC waste and SBS", Remote Sensing, Environment and Transportation Engineering (RSETE), 2011 International Conference on, IEEE, Jun. 24, 2011, pp. 3946-3949.

International Search Report in PCT International Application No. PCT/EP2020/062790 mailed Aug. 4, 2020.

ROAD MAKING MATERIAL COMPRISING PVC, A METHOD OF PRODUCING SAID ROAD MAKING MATERIAL AND A ROAD MADE THEREFROM

RELATED APPLICATIONS

This application is a U.S. national phase application of PCT International Patent Application No. PCT/EP2020/062790, filed on May 7, 2020, which claims the benefit of and priority to GB Patent Application No. 1906629.9, filed May 10, 2019, each of which is hereby incorporated by reference in its entirety.

BACKGROUND

This invention relates to a road making material.

Materials for making roads, sometimes called pavements in some jurisdictions, include stone, aggregate and bitumen. The term "road" used herein includes within its scope pedestrian paths (known as pavements, or sidewalks in some countries) or cycle paths.

The term "asphalt" is used herein to refer to the combination of aggregate and bitumen. Generally there is 95% aggregate in asphalt although this varies depending on the performance required.

Bitumen is a sticky black and highly viscous liquid or semi-solid form of petroleum and may be found in natural deposits or may be refined. Asphalt generally comprises aggregate with a mesh size of up to about 3 cm. Aggregate is generally heated to a temperature of 150° C.-250° C. and mixed in a plant with bitumen. The resulting compound is taken to a roadway where it is poured into a laying machine and applied to a road surface, whereupon it is rolled before the mixture cools. Such road surfaces are susceptible to being permeated by rain water and for the surface to break up leaving potholes which are damaging to vehicle tyres, wheels and suspensions, and which can cause severe accidents.

Current bitumen compound suffers from temperature effects, oxidation leading to cracking and crazing, and rutting reducing the life of roads, and relatively high cost in needing to repair or resurface a road on a regular basis.

To alleviate these issues the asphalt industry has invested significant resources to develop polymer modified bitumen (PMB). PMB products contain virgin polymers which are mechanically sheared into the bitumen. The resultant mix of bitumen and polymers is then transported in liquid form to asphalt plants before mixing with aggregate to produce asphalt. PMB is expensive, it cannot be stored indefinitely, and it requires specialist heated storage units. This creates issues of wastage with unused material having to be disposed of or used when not required.

Polyvinylchloride (PVC) is a widely produced synthetic plastic polymer. PVC may be rigid or flexible depending on the presence of additives which promote flexibility; such additives are known as plasticizers, and phthalates are commonly used as such additives in PVC. Depending on the additives used and the previous use and treatment, PVC materials have highly variable melting points ($T_m$), typically spanning from 100° C. to 260° C., and a highly variable glass transition temperature ($T_g$) of −50° C. to 200° C.

The inventors have surprisingly found that polyvinylchloride plastics, including recycled polyvinylchloride plastics, can be utilised to partially replace the bitumen in an asphalt mix, unlike existing PMB-type asphalts wherein the aggregate is replaced in the asphalt mix. The present invention allows for the plastics materials replacing bitumen to comprise more than 10% polyvinylchloride by weight whilst still providing a suitable mix of plastics, bitumen, and aggregate for use as a road surface. Additionally, the present invention allows for polyvinylchloride plastics to be present in a blend with other types of plastics, such as waste plastics.

The present invention provides an improved method for producing a road making material and a road making material.

DETAILED DESCRIPTION

In one aspect, the invention provides a road making material comprising aggregate, bitumen, and a plastics material, wherein the plastics material comprises more than 10% polyvinylchloride (PVC) by weight, and wherein the polyvinylchloride has a glass transition temperature of no more than 180° C.

The glass transition temperature of the polyvinylchloride may be no more than 180° C. and the melting point of the polyvinylchloride may be in excess of 180° C. Alternatively, both the glass transition temperature and the melting point of the polyvinylchloride may be no more than 180° C. It will be understood that the melting point of a material will always be greater than the glass transition temperature the material. As such, the melting point of the polyvinylchloride is greater than the glass transition temperature of the polyvinylchloride.

The glass transition temperature is the temperature at which the polyvinylchloride material changes from a brittle substance into a softer material like a putty. This allows it to be fully homogenised into the asphalt mix and the PVC cannot be detected as separate plastic particles once mixed in. It will be understood that the term "glass transition" means the reversible transition of a polymer from a hard and relatively brittle "glassy" state into a viscous or rubbery state as the temperature is increased. The "glass transition temperature" is defined as the temperature at which the Gibbs free energy is such that the activation energy for the cooperative movement of around 50 elements of the polymer is exceeded. This allows molecular chains to slide past each other when a force is applied. The glass transition temperature may be determined by a range of techniques known in the art, including differential scanning calorimetry, thermal mass analysis, or dynamic mass analysis. Preferably, the glass transition temperature is determined by any suitable differential scanning calorimeter, such as the DSC 2500 supplied by TA Instruments, or the DSC7000X or DSC7020 supplied by Hitachi High-Technologies Corporation. Most preferably, the glass transition temperature is determined by the DSC3+ supplied by Metter Toldeo, suitably using standard operating parameters.

The invention also relates to a road making material comprising aggregate, bitumen, and a plastics material, wherein the plastics material comprises more than 10% polyvinylchloride (PVC) by weight, and wherein the amount of plastics material is 0.1 kg to 15 kg in each tonne of road making material.

In one aspect, the invention provides a method of producing a road making material comprising:
 (a) heating aggregate;
 (b) heating bitumen;
 (c) mixing the heated aggregate and bitumen;
 (d) adding a plastics material to the aggregate and bitumen mixture; and
 (e) mixing to incorporate the plastics with the aggregate and bitumen;

wherein the plastics material comprises more than 10% polyvinylchloride (PVC) by weight,
wherein the polyvinylchloride has a glass transition temperature of no more than 180° C.

In another aspect, the invention provides a method of producing a road making material comprising:
(a) heating aggregate;
(b) heating bitumen;
(c) mixing the heated aggregate and bitumen;
(d) adding a plastics material to the aggregate and bitumen mixture; and
(e) mixing to incorporate the plastics with the aggregate and bitumen;
wherein the plastics material comprises more than 10% polyvinylchloride (PVC) by weight; and wherein the amount of plastics material is 0.1 kg to 15 kg in each tonne of road making material.

In one aspect the term "plastics material" as used herein refers to any material or blend of materials consisting of synthetic organic polymers, for example polymers derived from petrochemicals. Any reference to a "plastic" as used herein likewise suitably refers to any synthetic organic polymer.

In one aspect the plastics material comprises at least 50% polyvinylchloride (PVC) by weight. The plastics material may comprise at least 60% polyvinylchloride (PVC) by weight, such as at least 65%, at least 70%, at least 75%, at least 80%, at least 85%, or at least 90%. Preferably, the plastics material comprises at least 90% polyvinylchloride (PVC) by weight. Most preferably, the plastics material comprises 100% polyvinylchloride (PVC) with no other plastics materials present.

In one aspect, the polyvinylchloride has a glass transition temperature of no more than 170° C. Preferably, the polyvinylchloride has a glass transition temperature of no more than 165° C. Most preferably, the polyvinylchloride has a glass transition temperature of no more than 160° C.

In one aspect, the polyvinylchloride is plasticised polyvinylchloride.

In one aspect, the polyvinylchloride has a glass transition temperature of between 80° C. and 180° C., such as 80° C., 90° C., 100° C., 110° C., 120° C., 130° C., 140° C., 150° C., 160° C., 170° C., or 180° C. In another aspect, the polyvinylchloride has a glass transition temperature of between 90° C. and 180° C., such as between 100° C. and 180° C. or between 110° C. and 180° C. In another aspect, the polyvinylchloride has a glass transition temperature of between 110° C. and 170° C., between 120° C. and 170° C., or between 130° C. and 170° C. In another aspect, the polyvinylchloride has a glass transition temperature of between 110° C. and 160° C., between 120° C. and 160° C., or between 130° C. and 160° C. Preferably, the polyvinylchloride has a glass transition temperature of between 120° C. and 160° C.

The PVC having a glass transition temperature of no more than 180° C. may be a single species of PVC molecule with a glass transition temperature of no more than 180° C., or may be a mixture of different PVC molecules, each of which have a glass transition temperature of no more than 180° C.

In one aspect, the plastics material has a melting point of between 100° C. and 200° C. In another aspect, the plastics material has a melting point of between 100° C. and 190° C., between 100° C. and 190° C., between 120° C. and 190° C., or between 130° C. and 190° C. In another aspect, the plastics material has a melting point of between 100° C. and 180° C., between 110° C. and 180° C., between 120° C. and 180° C., or between 130° C. and 180° C. Preferably, the plastics material has a melting point of between 120° C. and 180° C.

In one aspect, the plastics material for use in the present invention comprises more than 10% polyvinylchloride by weight, wherein the polyvinylchloride has a glass transition temperature of no more than 170° C. Preferably, the plastics material for use in the present invention comprises more than 10% polyvinylchloride by weight, wherein the polyvinylchloride has a glass transition temperature of no more than 160° C.

In one aspect, the plastics material for use in the present invention comprises at least 50% polyvinylchloride by weight, wherein the polyvinylchloride has a glass transition temperature of no more than 170° C. Preferably, the plastics material for use in the present invention comprises at least 50% polyvinylchloride by weight, wherein the polyvinylchloride has a glass transition temperature of no more than 160° C.

In one aspect, the plastics material for use in the present invention comprises at least 90% polyvinylchloride by weight, wherein the polyvinylchloride has a glass transition temperature of no more than 170° C. Preferably, the plastics material for use in the present invention comprises at least 90% polyvinylchloride by weight, wherein the polyvinylchloride has a glass transition temperature of no more than 160° C.

In one aspect, the plastics material for use in the present invention comprises 100% polyvinylchloride with no other plastics materials present, wherein the polyvinylchloride has a glass transition temperature of no more than 170° C. Preferably, the plastics material for use in the present invention comprises 100% polyvinylchloride with no other plastics materials present, wherein the polyvinylchloride has a glass transition temperature of no more than 160° C.

The plastics material for use in the present invention may also comprise less than 90% other common polymer plastics. Common polymer plastics, such as waste plastics, that may be used in the present invention include low density polyethylene (LDPE), used for bags, sacks, bin liners, squeezable detergent bottles etc.; high density polyethylene (HDPE), used for bottles for various liquids, among other things; polyvinyl butyral (PVB) is used to laminate and toughen glass, among other things; and styrene isoprene styrene (SIS) is used for adhesives and sealants, etc. Currently, such plastics materials are used in virtually every sector of the economy from agriculture to packaging, automobile and building construction, and communications equipment. Such plastics material is non-biodegradable and can remain stable for as long as 4,500 years. The majority of this material is either landfilled or burned in incinerators across the globe, in some cases despite significant efforts to recycle. Burning plastic materials has been shown to release gases which are dangerous to the environment.

In an embodiment the plastics material may be a blend comprising PVC and one or more of HDPE, LDPE, PVB, and SIS. For example, in one embodiment the plastics material may be a blend comprising PVC and HDPE. In another embodiment the plastics material may be a blend comprising PVC and LDPE. In another embodiment the plastics material may be a blend comprising PVC and PVB. In another embodiment the plastics material may be a blend comprising PVC and SIS.

In one preferred embodiment the plastics material is recovered or waste plastic, or a blend of waste or recovered plastic, and may comprise more than one type of plastics materials. A recovered plastics material is therefore one which is not a virgin or unused plastics material. For the avoidance of doubt, virgin/unused plastics are equally applicable for use in the invention.

Preferably the plastics material is not a 'virgin' or unused plastic material.

Preferably, the plastics material is obtainable by a method comprising stripping the insulation from electrical cables, wherein the insulation comprises or consists of polyvinylchloride.

In one aspect, the plastics material comprises no more than 10% of contaminant plastics by weight. In one aspect, the plastics material comprises no more than 5% contaminant plastics by weight, such as no more than 4%, no more than 3%, no more than 2%, or no more than 1%. Preferably, the plastics material comprises no more than 2% contaminant plastics by weight. Contaminant plastics have a glass transition temperature of greater than 180° C., such as greater than 190° C. The contaminant plastics may include polyvinylchloride having a glass transition temperature of greater than 180° C. The contaminant plastics may also include polypropylene, polystyrene, polycarbonate, or polyethylene terephthalate. It will be understood that any contaminant polyvinylchloride plastics are distinct from the more than 10% polyvinylchloride by weight present in the plastics material for use in the present invention, in that the contaminant polyvinylchloride plastics have a glass transition temperature of greater than 180° C., whereas the more than 10% polyvinylchloride by weight present in the plastics material for use in the present invention has a glass transition temperature of no more than 180° C.

Contaminant plastics may also be any plastics having a melting temperature of greater than 200° C.

In one aspect, the plastics material may comprise a blend of polyvinylchloride having a glass transition temperature of no more than 180° C. and any other plastic having a glass transition temperature between 80° C. and 180° C., wherein the plastics material comprises more than 10% polyvinylchloride by weight. Preferably the plastics material does not comprise any plastic that has a glass transition temperature higher than 180° C. Preferably the plastics material does not comprise any plastic that has a glass transition temperature lower than 80° C.

In one aspect of the method, the aggregate is heated to 130° C.-180° C. Preferably the aggregate is heated to 140-170° C., such as 150-170° C., such as 160-170° C., such as 160° C., 161° C., 162° C., 163° C., 164° C., 165° C., 166° C., 167° C., 168° C., 169° C., or 170° C.

In one aspect of the method, the bitumen is heated to 130° C.-180° C. Preferably the bitumen is heated to 140-170° C., such as 150-170° C., such as 160-170° C., such as 160° C., 161° C., 162° C., 163° C., 164° C., 165° C., 166° C., 167° C., 168° C., 169° C., or 170° C.

Preferably, the plastics material is at ambient temperature when added to the aggregate and bitumen mixture. It will be understood that ambient temperature is any temperature within the range 5° C. to 50° C., preferably between 20° C. and 25° C.

In one aspect of the method, before mixing with aggregate and bitumen, the plastics material is heated to a temperature of 110° C.-180° C., preferably 120-170° C., such as 130-170° C., such as 155-165° C., e.g. 155° C., 156° C., 157° C., 158° C., 159° C., 160° C., 161° C., 162° C., 163° C., 164° C., or 165° C. In one aspect, the plastics material is heated to 160° C. before mixing with aggregate and bitumen.

In one embodiment the aggregate has a mesh size of 1 mm-55 mm. Preferably the aggregate has a mesh size of 5 mm-35 mm or 5 mm-20 mm. Preferably the aggregate has a mesh size of 10 mm, 11 mm, 12 mm, 13 mm, 14 mm, 15 mm, 16 mm, 17 mm, 18 mm, 19 mm, or 20 mm.

In one aspect of the method, the constituents are mixed for at least 30 seconds, at least 35 seconds, or at least 40 seconds. Preferably the constituents are mixed for at least 45 seconds.

In one aspect of the method, no other materials are added to the mix, and the road making material consists of aggregate, bitumen and a plastics material.

Preferably, the amount of bitumen used is reduced by the weight of the plastics material added when compared to the amount of bitumen used in production of comparable standard products. For example, when the road making material is 10 mm stone mastic asphalt, according to the present invention the bitumen can comprise 4.7% by weight of the aggregate, bitumen, and plastics material mix, compared to 5.7% by weight of the aggregate, bitumen, and plastics material mix in standard 10 mm stone mastic asphalt. Preferably the bitumen content is between 4.7% and up to, but not including, 5.7% by weight of the aggregate, bitumen, and plastics material mix in standard 10 mm stone mastic asphalt, such as 4.8%, 4.9%, 5%, 5.1%, 5.2%, 5.3%, 5.4%, 5.5% or 5.6% by weight. In one aspect the bitumen comprises 5.4% by weight of the aggregate, bitumen, and plastics material mix In another example, when the road making material is 6 mm, 10 mm and 20 mm asphaltic concrete according to the present invention the bitumen can comprise 3.1% by weight of the aggregate, bitumen, and plastics material mix, compared to 4.1% by weight of the aggregate, bitumen, and plastics material mix in standard 6 mm, 10 mm and 20 mm asphaltic concrete. Preferably the bitumen content is between 3.1% and up to, but not including, 4.1% by weight of the aggregate, bitumen, and plastics material mix in standard 6 mm, 10 mm and 20 mm asphaltic concrete, such as 3.2%, 3.3%, 3.4%, 3.5%, 3.6%, 3.7%, 3.8%, 3.9% and 4%, by weight. In one aspect the bitumen comprises 3.8% by weight of the aggregate, bitumen, and plastics material mix In another example, when the road making material is hot rolled asphalt according to the present invention the bitumen can comprise 4.9% by weight of the aggregate, bitumen, and plastics material mix, compared to 5.9% by weight of the aggregate, bitumen, and plastics material mix in standard hot rolled asphalt. Preferably the bitumen content is between 4.9% and up to, but not including, 5.9% by weight of the aggregate, bitumen, and plastics material mix in standard hot rolled asphalt, such as 5.0%, 5.1%, 5.2%, 5.3%, 5.4%, 5.5% 5.6%, 5.7% and 5.8% by weight. In one aspect the bitumen comprises 5.6% by weight of the aggregate, bitumen, and plastics material mix.

In another example, when the road making material is heavy duty 32 mm, according to the present invention the bitumen can comprise 2.4% by weight of the aggregate, bitumen, and plastics material mix, compared to 3.4% by weight of the aggregate, bitumen, and plastics material mix in heavy duty 32 mm. Preferably the bitumen content is between 2.4% and up to, but not including, 3.4% by weight of the aggregate, bitumen, and plastics material mix in standard heavy duty 32 mm, such as 2.5%, 2.6%, 2.7%, 2.8%, 2.9%, 3% 3.1%, 3.2% and 3.3% by weight. In one aspect the bitumen comprises 3.1% by weight of the aggregate, bitumen, and plastics material mix.

The standards for all asphalt on public roads in the UK and Europe are covered by the Series 900 standards and BS EN 13108:—Bituminous mixtures, material, specifications.

The method may also be applied to any asphalt in the Series 900 and BS EN (British Standards European Norm) 13108, including:

BS EN 13108-1 Asphalt concrete (including 6 mm, 10 mm and 20 mm, 32 mm);
BS EN 13108-2 Asphalt concrete for thin layers (including 6 mm, 10 mm and 20 mm, 32 mm);
BS EN 13108-3 Soft asphalt;
BS EN 13108-4 Hot rolled asphalt; (HRA)
BS EN 13108-5 Stone mastic asphalt; (SMA)
BS EN 13108-6 Mastic asphalt;
BS EN 13108-7 Porous asphalt;
BS EN 13108-8 Reclaimed asphalt;
BS EN 13108-20 Type testing;
BS EN 13108-21 Factory production control.

The method may also be applied to any asphalt in the GOST 9128.

The method may also be applied to any asphalt in the standards provided by the American Association of State Highway and Transportation Officials (AASHTO).

In one embodiment, the amount of bitumen used is reduced by the weight of the plastics material added when compared to the amount of bitumen used in the standard products according to the British Series 900 standards, BS EN 13108, GOST9128, or standards provided by the American Association of State Highway and Transportation Officials (AASHTO). In one aspect, the amount of bitumen is reduced by up to 10%, such as reduced by up to 9%, 8%, 7%, 6%, 5%, 4%, or 3% when compared to the amount of bitumen used in the standard products according to the BS EN 13108, GOST9128, or standards provided by the American Association of State Highway and Transportation Officials (AASHTO). In one aspect, the weight of bitumen per tonne of asphalt is reduced by 3 kg when compared to the weight of bitumen present in the standard products according to the BS EN 13108, GOST9128, or standards provided by the American Association of State Highway and Transportation Officials (AASHTO). In one aspect the bitumen is replaced by plastics materials, such as those disclosed herein, preferably in an equal amount by weight. In one aspect the amount of aggregate in these standards is not reduced even when the amount of bitumen is reduced.

In one aspect the invention relates to a road making material comprising, consisting essentially of, or consisting of, bitumen, aggregate and a plastics material, wherein the plastics material comprises more than 10% polyvinylchloride (PVC) by weight, and wherein the polyvinylchloride has a glass transition temperature of no more than 180° C.

In one aspect the invention relates to a road making material comprising, consisting essentially of, or consisting of, bitumen, aggregate and a plastics material, such as a recovered plastics material, wherein the aggregate forms at least 95% by weight of the road making material or at least 95% by weight of the combined weight of the aggregate, bitumen, and plastics material, wherein the plastics material comprises more than 10% polyvinylchloride (PVC) by weight, and wherein the polyvinylchloride has a glass transition temperature of no more than 180° C.

In one aspect the invention relates to a road making material comprising no more than 4.99% bitumen by weight of the road making material, or by weight of the combined weight of the bitumen, aggregate and plastics material, such as no more than 4.9%, 4.8% and preferably no more than 4.7% bitumen by weight, wherein the plastics material comprises more than 10% polyvinylchloride (PVC) by weight, and wherein the polyvinylchloride has a glass transition temperature of no more than 180° C.

The aggregate, bitumen, and plastics material may have any of the properties described herein.

The road making material may comprise aggregate, bitumen, and a plastics material, wherein:
(a) when the road making material is 10 mm stone mastic asphalt, the bitumen comprises at least 4.7% but no more than 5.69% by weight of the aggregate, bitumen, and plastics material mix;
(b) when the road making material is 6 mm, 10 mm, or 20 mm asphaltic concrete, the bitumen comprises at least 3.1% but no more than 4.09% by weight of the aggregate, bitumen, and plastics material mix;
(c) when the road making material is hot rolled asphalt, the bitumen comprises at least 4.9% but no more than 5.89% by weight of the aggregate, bitumen, and plastics material mix; or
(d) when the road making material is heavy duty 32 mm, the bitumen comprises at least 2.4% but no more than 3.39% by weight of the aggregate, bitumen, and plastics material mix, wherein the plastics material comprises more than 10% polyvinylchloride (PVC) by weight, and wherein the polyvinylchloride has a glass transition temperature of no more than 180° C.

The road making material may comprise aggregate, bitumen, and a plastics material, wherein:
(a) when the road making material is 10 mm stone mastic asphalt, the bitumen comprises at least 5.4% but no more than 5.69% by weight of the aggregate, bitumen, and plastics material mix;
(b) when the road making material is 20 mm asphaltic concrete, the bitumen comprises at least 3.8% but no more than 4.09% by weight of the aggregate, bitumen, and plastics material mix;
(c) when the road making material is hot rolled asphalt, the bitumen comprises at least 5.6% but no more than 5.89% by weight of the aggregate, bitumen, and plastics material mix; or
(d) when the road making material is heavy duty 32 mm, the bitumen comprises at least 3.1% but no more than 3.39% by weight of the aggregate, bitumen, and plastics material mix,
wherein the plastics material comprises more than 10% polyvinylchloride (PVC) by weight, and
wherein the polyvinylchloride has a glass transition temperature of no more than 180° C. These are non-limiting examples and a person skilled in the art would readily be able to apply the teaching of the present invention to any of the many varieties of asphalt produced globally.

In one aspect the road making material comprises bitumen, aggregate and a plastics material, wherein the aggregate forms at least 95% by weight of the road making material, or at least 95% by weight of the combined weight of the aggregate, bitumen, and plastics material mix, wherein the plastics material comprises more than 10% polyvinylchloride (PVC) by weight, and wherein the polyvinylchloride has a glass transition temperature of no more than 180° C.

In one aspect the road making material consists of, or consists essentially of, bitumen, aggregate and a recycled plastics material, and the aggregate forms at least 95% by weight of the road making material or at least 95% by weight of the combined weight of the aggregate, bitumen, and plastics material mix, wherein the plastics material comprises more than 10% polyvinylchloride (PVC) by weight, and wherein the polyvinylchloride has a glass transition temperature of no more than 180° C.

In other aspects the road making material may comprise at least 96% aggregate, at least 97% aggregate, 98% aggregate, 99% aggregate and at least 99.5% aggregate by weight of the road surface.

In other aspects the road making material may comprise at least 94% aggregate, at least 93% aggregate, 92% aggregate, 91% aggregate and at least 90% aggregate by weight of the road surface.

In one aspect the road making material comprises no more than 4.99% bitumen by weight of the road making material, or by weight of the combined weight of the bitumen, aggregate and plastics material, such as no more than 4.9%, 4.8% and preferably no more than 4.7% bitumen by weight.

Preferably the bitumen is at least 4% by weight of the road making material, or by weight of the combined weight of the bitumen, aggregate and plastics material, such as at least 4.1%, 4.2%, 4.3%, 4.4% or 4.5% or more.

The amount of the plastics material may be 0.1 kg to 10 kg present in each tonne of asphalt. Preferably the amount of plastics material is 2 kg-4 kg present in each tonne of asphalt. Preferably 3 kg of plastics material is present in each tonne of asphalt.

In one aspect, the amount of the plastics material may be 0.1 kg to 15 kg present in each tonne of road making material. Preferably, the amount of the plastics material may be 0.1 kg to 14 kg present in each tonne of road making material. Preferably, the amount of the plastics material may be 0.1 kg to 13 kg present in each tonne of road making material. Preferably, the amount of the plastics material may be 0.1 kg to 12 kg present in each tonne of road making material. Preferably, the amount of the plastics material may be 0.1 kg to 11 kg present in each tonne of road making material. Preferably, the amount of the plastics material may be 0.1 kg to 10 kg present in each tonne of road making material. Preferably, the amount of the plastics material may be 0.1 kg to 9 kg present in each tonne of road making material. Preferably, the amount of the plastics material may be 0.1 kg to 8 kg present in each tonne of road making material. Preferably, the amount of the plastics material may be 0.1 kg to 7 kg present in each tonne of road making material. Preferably, the amount of the plastics material may be 0.1 kg to 6 kg present in each tonne of road making material. Preferably, the amount of the plastics material may be 0.1 kg to 5 kg present in each tonne of road making material. Preferably, the amount of the plastics material may be 0.1 kg to 4 kg present in each tonne of road making material. Preferably, the amount of the plastics material may be 0.1 kg to 3 kg present in each tonne of road making material. Preferably, the amount of the plastics material may be 0.1 kg to 2 kg present in each tonne of road making material.

In one aspect, the amount of plastics material may be 0.2 kg to 15 kg present in each tonne of road making material. In one aspect, the amount of plastics material may be 0.5 kg to 15 kg present in each tonne of road making material. In one aspect, the amount of plastics material may be 1 kg to 15 kg present in each tonne of road making material. In one aspect, the amount of plastics material may be 2 kg to 15 kg present in each tonne of road making material. In one aspect, the amount of plastics material may be 3 kg to 15 kg present in each tonne of road making material. In one aspect, the amount of plastics material may be 4 kg to 15 kg present in each tonne of road making material. In one aspect, the amount of plastics material may be 5 kg to 15 kg present in each tonne of road making material. In one aspect, the amount of plastics material may be 6 kg to 15 kg present in each tonne of road making material. In one aspect, the amount of plastics material may be 7 kg to 15 kg present in each tonne of road making material. In one aspect, the amount of plastics material may be 8 kg to 15 kg present in each tonne of road making material. In one aspect, the amount of plastics material may be 9 kg to 15 kg present in each tonne of road making material. In one aspect, the amount of plastics material may be 10 kg to 15 kg present in each tonne of road making material.

In another aspect, the amount of plastics material may be present in each tonne of asphalt, in any range specified with regards to road making material. For example, in one aspect, the amount of plastics material may be 0.1 kg to 15 kg present in each tonne of asphalt. For example, in one aspect, the amount of plastics material may be 0.2 kg to 15 kg present in each tonne of asphalt.

In one aspect, the bitumen content in the aggregate, bitumen, and plastics material mix is reduced by 0.3% by weight per tonne when compared to the minimum bitumen content of comparable standard products.

For example, when the road making material is 10 mm stone mastic asphalt, according to the present invention the bitumen can comprise 4.7% by weight of the aggregate, bitumen, and plastics material mix, compared to 5.7% by weight of the aggregate, bitumen, and plastics material mix in standard 10 mm stone mastic asphalt.

For example, when the road making material is 6 mm, 10 mm and 20 mm asphaltic concrete according to the present invention the bitumen can comprise 3.1% by weight of the aggregate, bitumen, and plastics material mix, compared to 4.1% by weight of the aggregate, bitumen, and plastics material mix in standard 10 mm stone mastic asphalt.

For example, when the road making material is hot rolled asphalt, according to the present invention the bitumen can comprise 4.9% by weight of the aggregate, bitumen, and plastics material mix, compared to 5.9% by weight of the aggregate, bitumen, and plastics material mix in standard 10 mm stone mastic asphalt.

For example, when the road making material is heavy duty 32 mm, according to the present invention the bitumen can comprise 2.4% by weight of the aggregate, bitumen, and plastics material mix, compared to 3.4% by weight of the aggregate, bitumen, and plastics material mix in standard 10 mm stone mastic asphalt.

We have demonstrated that the use of a plastics material comprising polyvinylchloride can permit a reduction in bitumen without any detriment in the road material properties.

The invention therefore is also related to the use of a plastics material, preferably recycled or waste plastics, as a bitumen replacement, suitably in an amount of 0.1 to 10 kg per tonne of asphalt, wherein the plastics material comprises more than 10% polyvinylchloride (PVC) by weight, and wherein the polyvinylchloride has a glass transition temperature of no more than 180° C.

In one aspect, the ratio of bitumen to plastics material is 4:1 to 19:1 by weight, 9:1 to 19:1 by weight, or 9:1 to 24:1 by weight.

In one embodiment, the ratio of aggregate to bitumen is 19:1 by weight.

The invention also provides a road making material comprising 90%-99% aggregate by weight of the aggregate, bitumen, and plastics material mix. The road making material may further comprise 4.6%-4.99% bitumen by weight of the aggregate, bitumen, and plastics material mix. The road making material may further comprise 0.01%-0.4% plastics material by weight of the aggregate, bitumen, and plastics material mix. In one aspect, the road making material may comprise 95% aggregate, 4.7% bitumen, and 0.3% plastics material by weight of the aggregate, bitumen, and plastics material mix. The road making material may also comprise 95% aggregate, 4.99% bitumen, and 0.01% plastics material by weight of the aggregate, bitumen, and plastics material mix; 95% aggregate, 4% bitumen, and 1% plastics material by weight of the aggregate, bitumen, and plastics material mix; 95% aggregate, 4.6% bitumen, and 0.4% plastics material by weight of the aggregate, bitumen, and plastics material mix; or 95% aggregate, 4.8% bitumen, and 0.2% plastics material by weight of the aggregate, bitumen, and plastics material mix.

The invention also provides a road making material comprising 94.3% aggregate, 5.4% bitumen, and 0.3% plastics material by weight of the aggregate, bitumen, and plastics material mix. The road making material may also comprise 95.9% aggregate, 3.8% bitumen, and 0.3% plastics material by weight of the aggregate, bitumen, and plastics material mix; 94.1% aggregate, 5.6% bitumen, and 0.3% plastics material by weight of the aggregate, bitumen, and plastics material mix; 96.6% aggregate, 3.1% bitumen, and 0.3% plastics material by weight of the aggregate, bitumen, and plastics material mix.

In one aspect, the road making material consists of aggregate, bitumen, and plastics material only.

In one embodiment the grade of bitumen is one of 40/60, 60/70, 80/100, or 100/150.

In one embodiment, the aggregate comprises stone dust and lime.

It will be understood that the plastics material comprising polyvinylchloride melted with hot bitumen and aggregate forms an oily coat which is provided over aggregate and the resulting mixture of a compound is laid onto a road surface. Such a technology provides improved strength of road surface. When waste plastics are utilised, benefits to the environment are also forthcoming.

In one aspect the invention further provides a method for laying a road surface using any road making material comprising aggregate, bitumen, and a plastics material disclosed herein, such as wherein:
(a) when the road making material is 10 mm stone mastic asphalt, the bitumen comprises at least 4.7% but no more than 5.69% by weight of the aggregate, bitumen, and plastics material mix;
(b) when the road making material is 6 mm, 10 mm and 20 mm asphaltic concrete, the bitumen comprises at least 3.1% but no more than 4.09% by weight of the aggregate, bitumen, and plastics material mix;
(c) when the road making material is hot rolled asphalt, the bitumen comprises at least 4.9% but no more than 5.89% by weight of the aggregate, bitumen, and plastics material mix; or
(d) when the road making material is heavy duty 32 mm, the bitumen comprises at least 2.4% but no more than 3.39% by weight of the aggregate, bitumen, and plastics material mix, wherein the plastics material comprises more than 10% polyvinylchloride (PVC) by weight, wherein the polyvinylchloride has a glass transition temperature of no more than 180° C., and wherein the road is made by laying the road making material at a temperature of 70° C.-160° C. and subsequently rolling the material so that it is compacted, the rolling weight being up to approximately 10,160 kg (10 ton).

In a preferred embodiment of the present invention, the road making material comprising aggregate, bitumen, and a plastics material, wherein the plastics material comprises 100% polyvinylchloride (PVC) by weight with no other plastic materials present, and wherein the polyvinylchloride has a glass transition temperature of no more than 160° C.

In a preferred embodiment of the present method, the plastics material comprises 100% polyvinylchloride (PVC) by weight with no other plastic materials present, and the polyvinylchloride has a glass transition temperature of no more than 160° C.

In another preferred embodiment of the present method, the plastics material comprises 100% polyvinylchloride (PVC) by weight with no other plastic materials present, the polyvinylchloride has a glass transition temperature of no more than 160° C., and the plastics material is provided or obtainable by a method comprising stripping the insulation from electrical cables, wherein the insulation comprises or consists of polyvinylchloride.

In one aspect, the invention comprises a stone mastic asphalt road surface, wherein the stone mastic asphalt comprises aggregate, bitumen, and a plastics material, wherein the plastics material comprises more than 10% polyvinylchloride (PVC) by weight, and wherein the polyvinylchloride has a glass transition temperature of no more than 180° C., wherein the road surface has improved stiffness when compared to a standard stone mastic asphalt road surface which does not comprise a plastics material comprising more than 10% PVC by weight. In one embodiment, the indirect tensile stiffness modulus (ITSM) of the stone mastic asphalt road surface comprising a plastics material comprising more than 10% PVC by weight is more than twice the ITSM of the standard stone mastic asphalt which does not comprise a plastics material comprising more than 10% PVC by weight. In one embodiment, the indirect tensile stiffness modulus (ITSM) of the stone mastic asphalt road surface comprising a plastics material comprising more than 10% PVC by weight is more than three times the ITSM of the standard stone mastic asphalt which does not comprise a plastics material comprising more than 10% PVC by weight. In various embodiments, the ITSM of the stone mastic asphalt road surface comprising a plastics material comprising more than 10% PVC may be at least 3000 MPa, at least 3500 MPa, at least 4000 MPa, at least 4500 MPa, at least 5000 MPa, at least 5500 MPa, or at least 6000 MPa.

In one aspect, the invention comprises a stone mastic asphalt road surface, wherein the stone mastic asphalt comprises aggregate, bitumen, and a plastics material, wherein the plastics material comprises more than 10% polyvinylchloride (PVC) by weight, and wherein the polyvinylchloride has a glass transition temperature of no more than 180° C., wherein the road surface has decreased water sensitivity when compared to a standard stone mastic asphalt road surface which does not comprise a plastics material comprising more than 10% PVC by weight. In one embodiment, the water sensitivity is decreased by 10%. In various embodiments, the water sensitivity is decreased by 3%, 4%, 5%, 6%, 7%, 8%, 9%, or 10%.

In one aspect, the invention comprises a stone mastic asphalt road surface, wherein the stone mastic asphalt comprises aggregate, bitumen, and a plastics material, wherein the plastics material comprises more than 10% polyvinylchloride (PVC) by weight, and wherein the polyvinylchloride has a glass transition temperature of no more than 180° C., wherein the road surface has decreased wheel tracking when compared to a standard stone mastic asphalt road surface which does not comprise a plastics material comprising more than 10% PVC by weight.

In one embodiment, rut depth is decreased by 10%. In one embodiment, rut depth of the stone mastic asphalt road surface comprising a plastics material comprising more than 10% PVC by weight is roughly half the rut depth of the standard stone mastic asphalt which does not comprise a plastics material comprising more than 10% PVC by weight. In various embodiments, the rut depth of the stone mastic asphalt road surface comprising a plastics material comprising more than 10% PVC is 2.7 mm, 2.6 mm, 2.5 mm, 2.4 mm, 2.3 mm, 2.2 mm, 2.1 mm, 2.0 mm, 1.9 mm, 1.8 mm, 1.7 mm, or 1.6 mm.

In one aspect, the invention comprises a stone mastic asphalt road surface, wherein the stone mastic asphalt comprises aggregate, bitumen, and a plastics material, wherein the plastics material comprises more than 10% polyvinylchloride (PVC) by weight, and wherein the polyvinylchloride has a glass transition temperature of no more than 180° C., wherein the road surface has decreased crack propagation when compared to a standard stone mastic asphalt road surface which does not comprise a plastics material comprising more than 10% PVC by weight. In one embodiment, crack propagation is decreased by at least 10%. In various embodiments, the crack propagation is 25.0 $N/mm^{3/2}$, 25.1 $N/mm^{3/2}$, 25.2 $N/mm^{3/2}$, 25.3 $N/mm^{3/2}$, 25.4 $N/mm^{3/2}$, 25.5 $N/mm^{3/2}$, 25.6 $N/mm^{3/2}$, 25.7 $N/mm^{3/2}$, 25.8 $N/mm^{3/2}$, 25.9 $N/mm^{3/2}$, 26.0 $N/mm^{3/2}$, 26.1 $N/mm^{3/2}$, 26.2 $N/mm^{3/2}$, 26.3 $N/mm^{3/2}$, 26.4 $N/mm^{3/2}$, 26.5 $N/mm^{3/2}$, 26.6 $N/mm^{3/2}$, 26.7 $N/mm^{3/2}$, 26.8 $N/mm^{3/2}$, 26.9 $N/mm^{3/2}$, or 27.0 $N/mm^{3/2}$.

In one embodiment, the invention comprises a stone mastic asphalt road surface, wherein the stone mastic asphalt comprises aggregate, bitumen, and a plastics material, wherein the plastics material comprises more than 10% polyvinylchloride (PVC) by weight, and wherein the polyvinylchloride has a glass transition temperature of no more than 180° C., wherein the road surface has any of the following features either alone or in combination, wherein the features may be as defined above: improved stiffness, decreased water sensitivity, decreased wheel tracking, or decreased crack propagation.

In one aspect, the invention provides a road making material comprising aggregate, bitumen, and a plastics material, wherein the plastics material comprises more than 10% polyvinylchloride (PVC) by weight, and wherein the polyvinylchloride has a melting point of between 100° C. and 200° C., such as 110°, 120° C., 130° C., 140° C., 150° C., 160° C., 170° C., 180° C., or 190° C. It will be understood that the various embodiments disclosed herein may be equally applicable to embodiments wherein the PVC is characterised by its melting point rather than its glass transition temperature. Alternatively, in some embodiments, the PVC may be characterised by both melting point and glass transition temperature.

This invention may utilise waste plastics that is collected from landfill sites, dumps, garbage trucks, school collection programmes, or by purchase from waste buyers/collectors, although it is to be understood that the improved road making material of this invention is not dependent upon the use of waste plastics since it is possible that plastics material from a chemical plant may be utilised.

Using plastics materials with bitumen to coat aggregate for a road making material has the following advantages over currently produced bitumised road surfaces:

1. A stronger road with increased tensile strength and resistance to rutting.
2. Enabling plants to produce high performance asphalts without the need for specific tanks and the associated issues with storage and use of PMB.
3. The use of waste plastics.
4. The reduction in the use of bitumen through replacement with plastics materials.
5. Improved fuel resistance.
6. Increased softening point.
7. Increased resistance to water sensitivity.

Any references and details above to components of the products of the invention can apply equally to the same components of the processes described herein. The processes of the invention are applicable to produce any products of the invention.

It will be understood that particular embodiments described herein are shown by way of illustration and not as limitations of the invention. The principal features of this invention can be employed in various embodiments without departing from the scope of the invention. Those skilled in the art will recognize, or be able to ascertain using no more than routine study, numerous equivalents to the specific procedures described herein. Such equivalents are considered to be within the scope of this invention and are covered by the claims. All publications and patent applications mentioned in the specification are indicative of the level of skill of those skilled in the art to which this invention pertains. All publications and patent applications are herein incorporated by reference to the same extent as if each individual publication or patent application was specifically and individually indicated to be incorporated by reference. The use of the word "a" or "an" when used in conjunction with the term "comprising" in the claims and/or the specification may mean "one," but it is also consistent with the meaning of "one or more," "at least one," and "one or more than one." The use of the term "or" in the claims is used to mean "and/or" unless explicitly indicated to refer to alternatives only or the alternatives are mutually exclusive, although the disclosure supports a definition that refers to only alternatives and "and/or." Throughout this application, the term "about" is used to indicate that a value includes the inherent variation of error for the device, the method being employed to determine the value, or the variation that exists among the study subjects. As used in this specification and claim(s), the words "comprising" (and any form of comprising, such as "comprise" and "comprises"), "having" (and any form of having, such as "have" and "has"), "including" (and any form of including, such as "includes" and "include") or "containing" (and any form of containing, such as "contains" and "contain") are inclusive or open-ended and do not exclude additional, unrecited elements or method steps Any part of this disclosure may be read in combination with any other part of the disclosure, unless otherwise apparent from the context.

The present invention is described in more detail in the following.

EXAMPLES

6% and 10% Bitumen Replacement

Tests were carried out to compare a standard (control) stone mastic asphalt (SMA) to an SMA with a 6% replacement of bitumen with polyvinylchloride (PVC) and an SMA with a 10% replacement of bitumen with PVC. The control stone mastic asphalt was made according to standard industry guidelines. UKAS accredited tests were used to ensure accurate results.

In both embodiments of the invention tested, the PVC comprised 100% of the plastics material and had a glass transition temperature of no more than 180° C.

As can be seen in the results below, a 6% replacement of bitumen with PVC resulted in a substantial increase in stiffness and substantially improved water sensitivity, as well as improved wheel tracking and crack propagation figures. Unexpectedly, these improvements are even greater when there is a 10% replacement of bitumen with PVC.

| Material | Test | Control Result | Result with 6% replacement of bitumen with PVC | Result with 10% replacement of bitumen with PVC |
| --- | --- | --- | --- | --- |
| SMA | Stiffness (ITSM) | 1823 MPa | 4032 MPa | 6451 MPa |
| SMA | Water sensitivity | 94.8% | 85% | 83% |
| SMA | Wheel tracking (rut depth) | 3.1 mm | 2.6 mm | 1.6 mm |
| SMA | Crack propagation | 23.8 N/mm$^{3/2}$ | 25.8 N/mm$^{3/2}$ | 27.0 N/mm$^{3/2}$ |

Comparative Data

The table below demonstrates the reduction in bitumen content that can be achieved by the present invention when compared to standard comparable products. These are non-limiting examples and a person skilled in the art would readily be able to apply the teaching of the present invention to any of the many varieties of asphalt produced globally.

| Product | Standard Minimum bitumen content possible (% by weight) | Minimum bitumen possible with plastics material added (% by weight) |
| --- | --- | --- |
| 10 mm Stone mastic asphalt | 5.7 | 4.7 |
| 20 mm Asphaltic concrete | 4.1 | 3.1 |
| Hot rolled asphalt 35 14 | 5.9 | 4.9 |
| Heavy duty 32 mm | 3.4 | 2.4 |

Certain preferred aspects of the invention include:

Statement 1. A road making material comprising aggregate, bitumen, and a plastics material, wherein the plastics material comprises more than 10% polyvinylchloride (PVC) by weight, and wherein the polyvinylchloride has a glass transition temperature of no more than 180° C.

Statement 2. The road making material of statement 1, wherein:
(a) when the road making material is 10 mm stone mastic asphalt, the bitumen comprises at least 4.7% but no more than 5.69% by weight of the aggregate, bitumen, and plastics material mix;
(b) when the road making material is 6 mm, 10 mm, or 20 mm asphaltic concrete, the bitumen comprises at least 3.1% but no more than 4.09% by weight of the aggregate, bitumen, and plastics material mix;
(c) when the road making material is hot rolled asphalt, the bitumen comprises at least 4.9% but no more than 5.89% by weight of the aggregate, bitumen, and plastics material mix; or
(d) when the road making material is heavy duty 32 mm, the bitumen comprises at least 2.4% but no more than 3.39% by weight of the aggregate, bitumen, and plastics material mix.

Statement 3. The road making material of Statement 2, wherein:
(a) when the road making material is 10 mm stone mastic asphalt, the aggregate comprises at least 94.3% by weight of the aggregate, bitumen, and plastics material mix;
(b) when the road making material is 6 mm, 10 mm, or 20 mm asphaltic concrete, the aggregate comprises at least 95.9% by weight of the aggregate, bitumen, and plastics material mix;
(c) when the road making material is hot rolled asphalt, the aggregate comprises at least 94.1% by weight of the aggregate, bitumen, and plastics material mix; or
(d) when the road making material is heavy duty 32 mm, the aggregate comprises at least 96.6% by weight of the aggregate, bitumen, and plastics material mix.

Statement 4. The road making material of any preceding Statement, wherein the plastics material comprises at least 50% polyvinylchloride (PVC) by weight.

Statement 5. The road making material of any preceding Statement, wherein the plastics material comprises at least 90% polyvinylchloride (PVC) by weight.

Statement 6. The road making material of any preceding Statement, wherein the plastics material comprises 100% polyvinylchloride (PVC) with no other plastics materials present.

Statement 7. The road making material of any preceding Statement, wherein the polyvinylchloride is plasticised polyvinylchloride.

Statement 8. The road making material of any preceding Statement, wherein the plastics material is obtainable by a method comprising stripping the insulation from electrical cables, wherein the insulation comprises polyvinylchloride.

Statement 9. The road making material of any preceding Statement, wherein the polyvinylchloride has a glass transition temperature of between 80° C. and 180° C.

Statement 10. The road making material of any preceding Statement, wherein the plastics material comprising polyvinylchloride has a melting point of between 100° C. and 200° C.

Statement 11. The road making material of any preceding Statement, wherein the plastics material comprises no more than 10% contaminant plastics by weight, said contaminant plastics having a glass transition temperature of greater than 180° C., optionally wherein said contaminant plastics includes polyvinylchloride having a glass transition temperature of greater than 180° C.

Statement 12. A method of producing a road making material comprising:
(a) heating aggregate;
(b) heating bitumen;
(c) mixing aggregate, bitumen;
(d) adding a plastics material to the aggregate and bitumen mixture; and
(e) mixing to incorporate the plastics with the aggregate and bitumen;
wherein the plastics material comprises more than 10% polyvinylchloride (PVC) by weight, wherein the polyvinylchloride has a glass transition temperature of no more than 180° C.

Statement 13. The method of Statement 12 wherein the road making materials is any of those of Statements 1-9.

Statement 14. The method of Statement 12 or 13, wherein the aggregate is heated to 130° C.-180° C.

Statement 15. The method of any one of Statements 12-4, wherein the bitumen is heated to 130° C.-180° C.

Statement 16. The method of any one of Statements 12-15, wherein the aggregate is heated to 165° C.

Statement 17. The method of any one of Statements 12-16, wherein the bitumen is heated to 165° C.

Statement 18. The method of any one of Statements 12-17, wherein the plastics material is added to the aggregate and bitumen mixture at ambient temperature.

Statement 19. The method of any one of Statements 12-18, wherein the aggregate, bitumen, and plastics material are mixed for at least 30 seconds.

Statement 20. The method of any one of Statements 12-19, wherein the constituents are mixed for at least 45 seconds.

Statement 21. The method of any one of Statements 12-20, wherein the plastics material comprises at least 50% polyvinylchloride (PVC) by weight.

Statement 22. The method of any one of Statements 12-21, wherein the plastics material comprises at least 90% polyvinylchloride (PVC) by weight.

Statement 23. The method of any one of Statements 12-22, wherein the plastics material comprises 100% polyvinylchloride (PVC) with no other plastics materials present.

Statement 24. The method of any one of Statements 12-23, wherein the polyvinylchloride is plasticised polyvinylchloride.

Statement 25. The method of any one of Statements 12-24, wherein the plastics material is obtainable by a method comprising stripping the insulation from electrical cables, wherein the insulation comprises polyvinylchloride.

Statement 26. The method of any one of Statements 12-25, wherein the polyvinylchloride has a glass transition temperature of between 80° C. and 180° C.

Statement 27. The method of any one of Statements 12-26, wherein the plastics material comprising polyvinylchloride has a melting point of between 100° C. and 200° C.

Statement 28. The method of any one of Statements 12-27, wherein:
(a) when the road making material is 10 mm stone mastic asphalt, the bitumen comprises at least 4.7% but no more than 5.69% by weight of the aggregate, bitumen, and plastics material mix;
(b) when the road making material is 6 mm, 10 mm, or 20 mm asphaltic concrete, the bitumen comprises at least 3.1% but no more than 4.09% by weight of the aggregate, bitumen, and plastics material mix;
(c) when the road making material is hot rolled asphalt, the bitumen comprises at least 4.9% but no more than 5.89% by weight of the aggregate, bitumen, and plastics material mix; or
(d) when the road making material is heavy duty 32 mm, the bitumen comprises at least 2.4% but no more than 3.39% by weight of the aggregate, bitumen, and plastics material mix.

Statement 29. The method of any one of Statements 12-28, wherein 3 kg of the plastics material is present per 1 tonne of roadmaking material.

Statement 30. The road making material of Statement 1, wherein the road making material is made by the method of Statement 12.

Statement 31. A method for making a road surface, the method comprising laying the road making material of Statements 1-11, or material made by Statements 12-29, to form a road surface.

The invention claimed is:

1. A method of producing a road making material comprising:
   (a) heating aggregate;
   (b) heating bitumen;
   (c) mixing the aggregate and the bitumen to form an aggregate and bitumen mixture;
   (d) adding a plastics material to the aggregate and bitumen mixture; and
   (e) mixing to incorporate the plastics material with the aggregate and bitumen mixture to form an aggregate, bitumen, and plastics material mix;
   wherein the plastics material comprises at least 80% polyvinylchloride (PVC) by weight;
   wherein a ratio of the bitumen to the plastics material is from 9:1 to 19:1 by weight; and
   wherein the aggregate, bitumen, and plastics material mix comprises from 2.4% to 5.89% of the bitumen with the proviso that:
      the bitumen is in an amount from 4.7 wt. % to 5.69 wt. % of the weight of the aggregate, bitumen, and plastics material mix for the road making material to be 10 mm stone mastic asphalt;
      the bitumen is in an amount from 3.1 wt. % to 4.09 wt. % of the weight of the aggregate, bitumen, and plastics material mix for the road making material to be 6 mm, 10 mm, or 20 mm asphaltic concrete;
      the bitumen is in an amount from 4.9 wt. % to 5.89 wt. % of the weight of the aggregate, the bitumen, and plastics material mix for the road making material to be hot rolled asphalt; or
      the bitumen is in an amount from 2.4 wt. % to 3.39 wt. % of the amount of the aggregate, the bitumen, and plastics material mix for the road making material to be heavy duty 32 mm.

2. The method of claim 1, wherein the aggregate and/or bitumen is heated to 130° C.-180° C.

3. The method of claim 1, wherein the aggregate and/or bitumen is heated to 165° C.

4. The method of claim 1, wherein the plastics material is added to the aggregate and bitumen mixture at ambient temperature.

5. The method of claim 1, wherein the aggregate, bitumen, and plastics material are mixed for at least 30 seconds.

6. The method of claim 1, wherein the plastics material comprises at least 50% polyvinylchloride (PVC) by weight.

7. The method of claim 1, wherein the plastics material is obtained by a method comprising stripping an insulation from electrical cables, wherein the insulation comprises polyvinylchloride.

8. The method of claim 7, wherein the polyvinylchloride is plasticised polyvinylchloride and/or has a glass transition temperature of between 80° C. and 180° C. and/or wherein the plastics material comprising polyvinylchloride has a melting point of between 100° C. and 200° C.

9. The method of claim 1, wherein an amount of plastics material is 2 kg to 4 kg in each tonne of asphalt and/or wherein 3 kg of the plastics material is present per 1 tonne of road making material.

10. The road making material of claim 1, wherein the aggregate comprises at least 94.1% by weight of the aggregate, bitumen, and plastics material mix with the proviso that:

the aggregate comprises at least 94.3% by weight of the aggregate, bitumen, and plastics material mix for the road making material to be 10 mm stone mastic asphalt;

the aggregate comprises at least 95.9% by weight of the aggregate, bitumen, and plastics material mix for the road making material to be 6 mm, 10 mm, or 20 mm asphaltic concrete;

the aggregate comprises at least 94.1% by weight of the aggregate, bitumen, and plastics material mix for the road making material to be hot rolled asphalt; or the aggregate comprises at least 96.6% by weight of the aggregate, bitumen, and plastics material mix for the road making material to be heavy duty 32 mm.

11. The road making material of claim 1, wherein the plastics material comprises no more than 10% contaminant plastics by weight, said contaminant plastics having a glass transition temperature of greater than 180° C.

12. A method for making a road surface from a road making material, the method comprising:
(a) heating aggregate;
(b) heating bitumen;
(c) mixing the aggregate and the bitumen to form an aggregate and bitumen mixture;
(d) adding a plastics material to the aggregate and bitumen mixture;
(e) mixing to incorporate the plastics with the aggregate and bitumen mixture to form a mixture of plastics, aggregate and bitumen to form an aggregate, bitumen, and plastics material mix;
  wherein the plastics material comprises at least 80% polyvinylchloride (PVC) by weight; and wherein a ratio of the bitumen to the plastics material is from 9:1 to 19:1 by weight; and
(f) laying the mixture of plastics, aggregate and bitumen to form a road surface, and
  wherein the aggregate, bitumen, and plastics material mix comprises from 2.4% to 5.89% of the bitumen with the proviso that:
    the bitumen is in an amount from 4.7 wt. % to 5.69 wt. % of the weight of the aggregate, bitumen, and plastics material mix for the road making material to be 10 mm stone mastic asphalt;
    the bitumen is in an amount from 3.1 wt. % to 4.09 wt. % of the weight of the aggregate, bitumen, and plastics material mix for the road making material to be 6 mm, 10 mm, or 20 mm asphaltic concrete;
    the bitumen is in an amount from 4.9 wt. % to 5.89 wt. % of the weight of the aggregate, the bitumen, and plastics material mix for the road making material to be hot rolled asphalt; or
    the bitumen is in an amount from 2.4 wt. % to 3.39 wt. % of the amount of the aggregate, the bitumen, and plastics material mix for the road making material to be heavy duty 32 mm.

13. A method of producing a road making material comprising:
forming a road making material from an aggregate, bitumen, and plastics material mix a comprising aggregate, bitumen and a plastics material,
wherein:
  wherein the plastics material comprises at least 80% polyvinylchloride (PVC) by weight:
    wherein a ratio of the bitumen to the plastics material is from 9:1 to 19:1 by weight; and
    wherein the aggregate, bitumen, and plastics material mix comprises from 2.4% to 5.89% of the bitumen with the proviso that:
    the bitumen is in an amount from 4.7 wt. % to 5.69 wt. % of the weight of the aggregate, bitumen, and plastics material mix for the road making material to be 10 mm stone mastic asphalt;
    the bitumen is in an amount from 3.1 wt. % to 4.09 wt. % of the weight of the aggregate, bitumen, and plastics material mix for the road making material to be 6 mm, 10 mm, or 20 mm asphaltic concrete;
    the bitumen is in an amount from 4.9 wt. % to 5.89 wt. % of the weight of the aggregate, the bitumen, and plastics material mix for the road making material to be hot rolled asphalt; or
    the bitumen is in an amount from 2.4 wt. % to 3.39 wt. % of the amount of the aggregate, the bitumen, and plastics material mix for the road making material to be heavy duty 32 mm.

* * * * *